Figure 4:
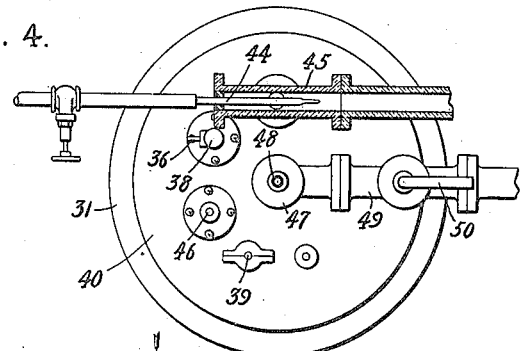

April 21, 1925.
F. M. DORSEY
1,535,019
METALLURGICAL PROCESS
Filed Sept. 18, 1920
3 Sheets-Sheet 1
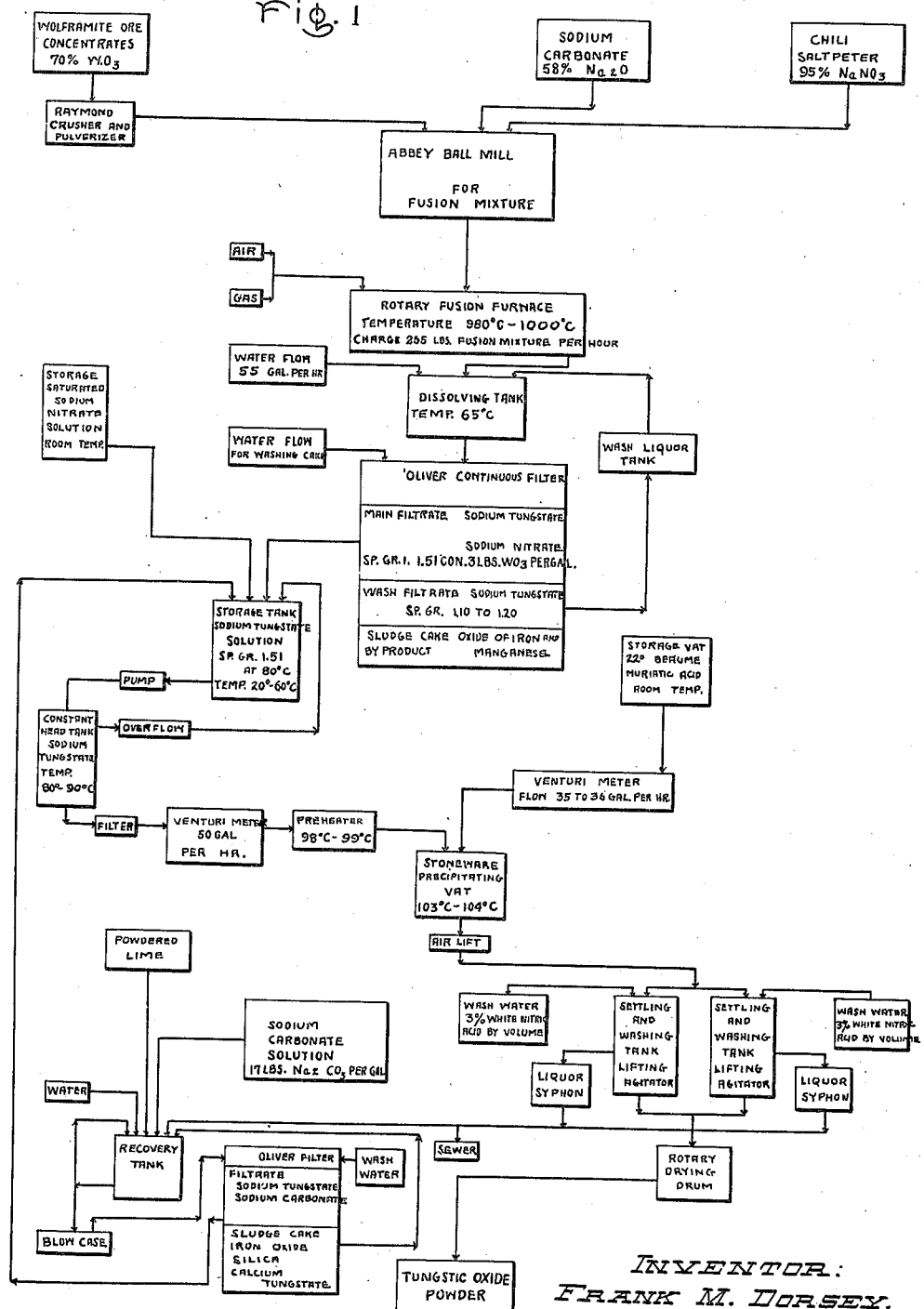

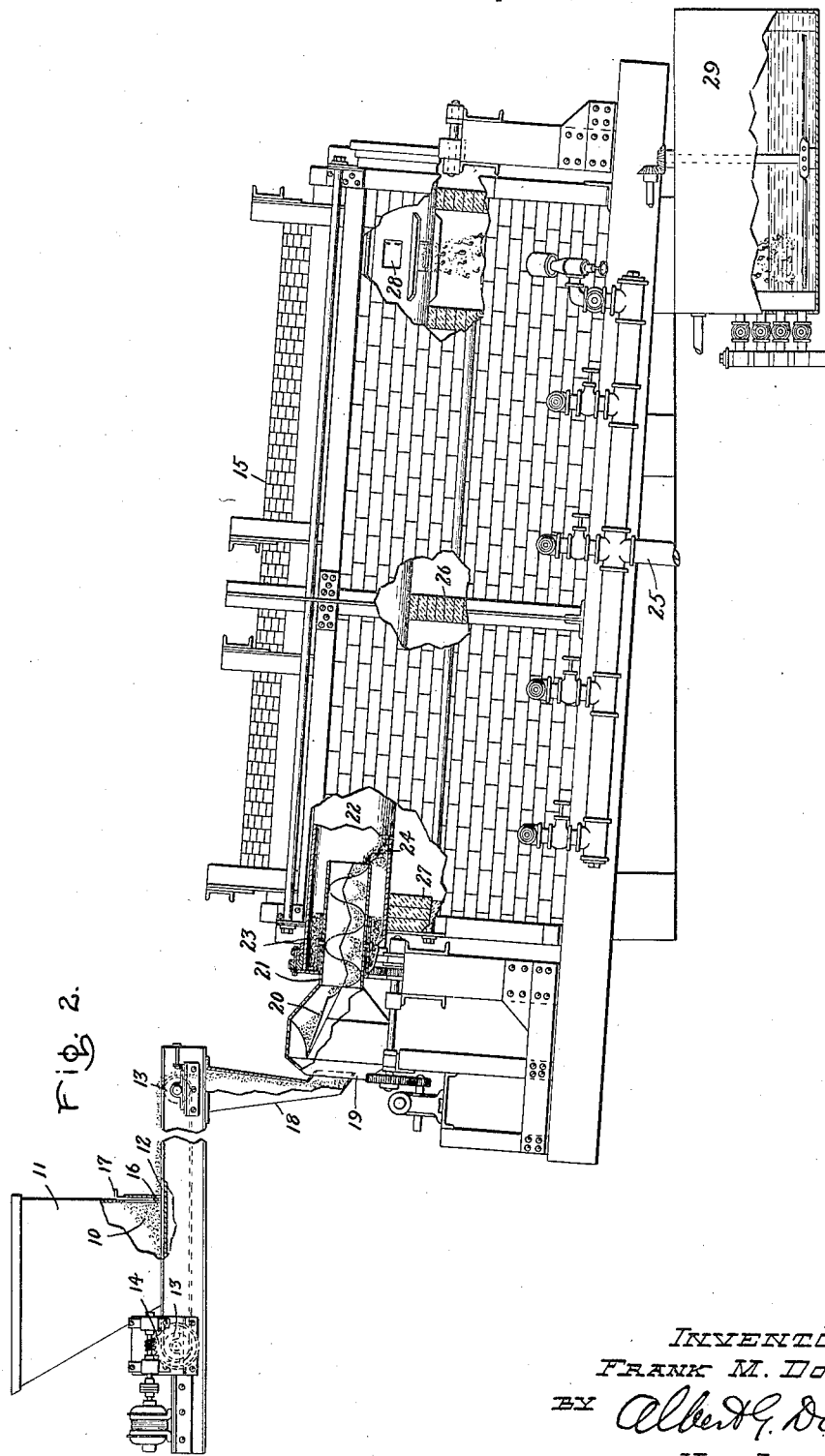

April 21, 1925.

F. M. DORSEY

METALLURGICAL PROCESS

Filed Sept. 18, 1920 3 Sheets-Sheet 3

INVENTOR:
FRANK M. DORSEY,
BY Albert E. Davis
HIS ATTORNEY.

Patented Apr. 21, 1925.

1,535,019

UNITED STATES PATENT OFFICE.

FRANK M. DORSEY, OF CLEVELAND, OHIO, ASSIGNOR TO GENERAL ELECTRIC COMPANY, A CORPORATION OF NEW YORK.

METALLURGICAL PROCESS.

Application filed September 18, 1920. Serial No. 411,166.

*To all whom it may concern:*

Be it known that I, FRANK M. DORSEY, a citizen of the United States, residing at Cleveland, county of Cuyahoga, State of Ohio, have invented certain new and useful Improvements in Metallurgical Processes, of which the following is a specification.

My invention relates to a method and apparatus for extracting tungsten, molybdenum and similar metals from their ores and more particularly to a method and apparatus for extracting these metals from their ores in a continuous and uninterrupted manner. Heretofore in the extraction of these metals from their ores, a number of discontinuous operations were performed. By the method and apparatus of my invention, it is possible to shorten the time required for extracting the metal from its ore and to eliminate considerable labor in handling the operation, as well as to increase the overall efficiency of yield, all of which results in reducing the cost of the metal.

In the extraction of tungsten from wolframite ore according to my invention, it is possible to secure substantially all of the tungsten which is present in the ore and with a very high degree of purity of the tungstic oxide obtained. Moreover, a few men are able to handle the whole process which formerly required a comparatively large number of men for the same amount of tungstic oxide produced. Since my process is continuous, the interrupted handling which is disagreeable, inconvenient and wasteful is obviated.

According to my invention, as applied to the extraction of tungsten from wolframite, the wolframite ore is fed to a crusher where it is pulverized and from which it passes to a mixer in which it is mixed with the other ingredients such as sodium carbonate and sodium nitrate. The mixture is then fed to the fusion furnace gradually passing therethrough so that the sodium carbonate reacts with the ore to form a soluble sodium compound of tungsten and the sodium nitrate supplies an oxidizing atmosphere to react with the iron and manganese to form oxides thereof which are easy to filter out. The fused mixture is then discharged into a dissolving tank where part of the fusion products go into solution and part are held in suspension as a solid residue. The tungstate of sodium is in solution and, on pasing through a filter, is passed into a temporary storage tank where sodium nitrate solution is added and from which it is pumped into a constant head tank. I prefer to return the wash liquors from the filter to the dissolving tank. After pasing through a filter and being preheated, the sodium tungstate solution from the constant head tank meets a flow of hydrochloric acid in a precipitating vat. An air lift removes all of the material from the precipitating vat and the material flows to a settling and washing tank which has facilities for draining the liquor after the precipitate (tungstic acid) has settled and for running in a weak nitric acid wash water solution and agitating the precipitate. After thorough washing, the precipitate is made into a thin paste and preferably dried to secure tungstic oxide in a powdered form, although by feeding the paste to a filter, a sludge cake of tungstic oxide may be obtained.

As an aid to overall efficiency, I prefer to take the mother liquor and wash waters from the settling and washing tank and deliver them to a recovery tank into which I also run powdered lime which reacts with the tungsten compounds contained in the mother liquor and wash waters to precipitate calcium tungstate. After the precipitate has settled, the liquor which is practically free of tungsten is run into the sewer. The precipitated calcium tungstate is then treated with the hot acid mother liquors from the precipitation in the main process to convert the calcium tungstate into crude tungstic oxide. The crude oxide is washed with water and treated with saturated sodium carbonate (soda ash) solution, dissolving the tungstic acid as sodium tungstate, which is filtered and returned to the sodium tungstate temporary storage tank previously mentioned.

Figure 3:
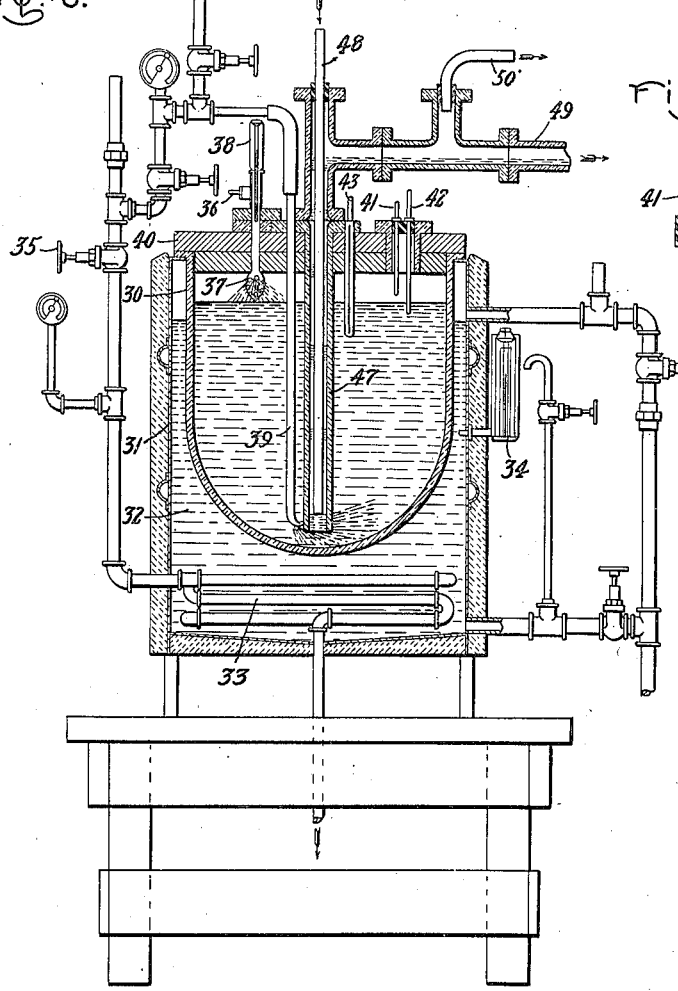
Figure 5:
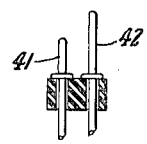

The specific process will be more fully understood by referring to the accompanying drawings in which Fig. 1 is a process flow sheet for the production of tungstic oxide from wolframite ore according to my invention, Fig. 2 is a side elevation partially in section of a rotary furnace I prefer to employ in carrying out my invention; Fig. 3 is a sectional side elevation of a precipitating vat which I prefer to use; Fig. 4 is a top plan view of the same and Fig. 5 is a fragmentary detail of Fig. 3.

While the process is continuous in that there is no interruption of feeding, for the purposes of explanation a unit charge will be given to show the proportions by weight of the materials used. For the unit charge, I take about 1080 pounds of wolframite ore concentrates (Fe, Mn) $WO_4$, which contain approximately 70 per cent of $WO_3$, and feed it to a Raymond crusher and pulverizer from which it is passed to an Abbey ball mill mixer at which point I add about 375 pounds of sodium carbonate having a sodium oxide ($Na_2O$) content of 58 per cent and about 45 pounds of Chile saltpeter containing about 95 per cent of sodium nitrate ($NaNO_3$). After about 15 minutes mixing, the fusion mixture 10 is passed into a control feed hopper 11 whose bottom consists of a belt 12 carried on suitable rollers 13 and driven by power applied to the gear 14 so that the top part of the belt moves toward the furnace 15. The furnace and mechanism are fully disclosed in the application of B. B. Fogler, Serial Number 411,211 filed September 18, 1920. The belt 12 moves a quantity of fusion mixture 10 from the hopper toward the furnace depending upon the size of the hole 16 in the hopper which is adjusted by raising or lowering the sliding door 17. I prefer, however, for the type of furnace disclosed, to feed at a rate equal to approximately 255 pounds of fusion mixture per hour. The fusion mixture falls into a chute 18, which directs it into the rotating feed hopper 19 from where it is guided by the vanes 20 into the internal screw conveyor 21 which delivers it into the furnace tube 22, the hopper 19 being fastened to the conveyor 21 which is inserted and centrally held in the tube 22 although insulated from the heat thereof by the packing 23 in order to prevent the powdered mixture from becoming plastic. A plastic mixture tends to gum up and close the furnace opening. From the end of the screw conveyor 21 the mixture falls on the inclined rotating furnace tube 22 which is sufficiently hot to prevent the fusion mixture becoming gummy but causes it to become mushy or semi-liquid practically at once, the mushy liquid flowing down the inclined tube. In order to more fully accomplish this purpose, a chain 24 is attached to the conveyor 21 as shown (or by a stirrup) and with the rotation of the tube any gummy mixture is broken up by the chain and prevented from enlarging. The tube 22 is heated to a temperature between 980° C. and 1000° C. by a gas and air mixture from the manifold 25, which burns around the tube. The reaction which probably takes place between the components of the fusion mixture is indicated by the following:

$$2(Fe)WO_4 + O + 2Na_2CO_3 = 2Na_2WO_4 + Fe_2O_3 + 2CO_2$$
$$3(Mn)WO_4 + O + 3Na_2CO_3 = 3Na_2WO_4 + Mn_3O_4 + 3CO_2$$

Near the lower end of the furnace tube 22 is a ring of wide apertures 28 through which flows the fused mixture into a lixiviating or dissolving tank 29 in which the uncontrolled temperature is about 65° C. the fused mixture supplying the heat. The fresh or wash water flow into the dissolving tank is approximately 55 gallons per hour; I prefer to return the wash liquor from the filter as more fully explained hereinafter. The sudden change in temperature as the fused mixture falls from the furnace into the dissolving tank causes the mixture to break up into fine particles. The water then dissolves the sodium tungstate, and any sodium carbonate and sodium nitrate which is undecomposed. The oxides of iron and manganese are insoluble. I prefer to stir up the contents of the dissolving tank in order to accelerate the dissolving operation.

The material in the dissolving tank overflows and is fed to an Oliver continuous filter which delivers a main filtrate containing sodium tungstate, sodium carbonate and sodium nitrate and gives a wash water filtrate containing sodium tungstate and a sludge cake by-product consisting of oxides of iron and manganese. The wash water is passed into a wash liquor tank from which it is run into the dissolving tank 29 as previously stated. The main filtrate has a specific gravity of 1.51 at 80° C. and is run from the filter into a temporary storage tank where the temperature ranges between 20° C. and 60° C. A saturated sodium nitrate solution is added to the sodium tungstate solution in the storage tank in the proportion of approximately 1 pound of sodium nitrate to 25 pounds of $WO_3$ contained in the sodium tungstate solution. The sodium nitrate decreases the solubility of the tungstic acid formed during precipitation operation hereinafter described, and results in a yellow, crystalline product.

From the temporary storage tank, the sodium tungstate solution is forced by a rotary pump into a constant head tank from which the overflow drains back into the storage tank. The solution in the constant head tank is maintained at a temperature between 80° C. and 90° C. by a steam coil. From the constant head tank the solution passes through a filter trap and then through a Venturi meter at the rate of approximately 50 gallons per hour. The solution now passes through a steam jacketed preheater, which gives it a temperature of about 98° C. or 99° C., and then into a stoneware precipitating vat (see Fig. 3). My object in preheating the sodium tungstate solution is to prevent the formation in the precipitating vat of a white precipitate, which is more soluble in water, which tends to absorb more impurities and which is less crystalline and therefore is more difficult to wash without its becoming colloidal.

The stoneware precipitating vat (Figs. 3 and 4) which is fully disclosed in the application of B. B. Fogler, Serial Number 411,210, filed September 18, 1920, comprises an earthenware kettle 30, in which the precipitating process is carried on, which is supported in a container 31 partially filled with a solution 32 of calcium chloride which serves to conduct the heat from the steam coils 33 to the kettle 30. Calcium chloride solution is preferred because the contents of the kettle 30 may be recovered from the solution should the kettle 30 crack and leak. A thermometer 34 indicates the temperature of the solution and a valve 35 controls the steam supply to the coils 33. The sodium tungstate solution enters the kettle 30 through the pipe 36 which has a spray nozzle 37 to break up the stream of solution. A thermometer 38 inserted in the pipe 36 indicates the temperature of the incoming sodium tungstate solution which has been preheated as previously described. To keep the solution in the kettle 30 thoroughly stirred up, air (or steam, if desired) is emitted near the bottom of the kettle 30 from the end of the pipe 39. The cover 40 tightly seals the kettle 30 and the gauges 41 and 42 inserted therein are used to indicate the level of the solution in the kettle. A thermometer 43 indicates the temperature of the solution in the kettle. An air ejector 44 inserted in the pipe 45, the lower end of which passes through the cover 40 and the upper end of which is open to the atmosphere, draws off the air, vapors and fumes present in the uper part of the kettle 30.

While the sodium tungstate solution is entering the precipitating vat through the spray nozzle 37, 22° Beaumé hydrochloric acid at room temperature is fed from a storage vat into the precipitating kettle 30 through the pipe 46 (Fig. 4) at the rate of 35 to 36 gallons per hour as indicated on a Venturi meter. I prefer to use a 150 per cent excess of hydrochloric acid in a hot solution in order to secure anhydrous tungstic acid ($H_2WO_4$) which has a deep yellow color and is insoluble in water. The yellow precipitate settles rapidly and is easily washed. Through the heating means previously described, the temperature of the solution in the precipitating kettle is maintained at about 103° C. or 104° C. as indicated on the thermometer 43. The reactions which probably take place are indicated as follows:

$$Na_2WO_4 + 2HCl \rightarrow H_2WO_4 + 2NaCl$$
$$Na_2CO_3 + 2HCl \rightarrow 2NaCl + H_2O + CO_2$$

In order to withdraw the solution and precipitate from the precipitating kettle, an air lift 47 is inserted through the cover 40 and extending nearly to the bottom of the kettle. Air under pressure is supplied through the central pipe 48 forcing the solution and precipitate to pass up the air lift around the central pipe 48 to the discharge pipe 49 down which it flows to the settling and washing tanks, the exhaust air from the lift passing to the atmosphere through the vent 50. Through the use of the air lift, it is possible to maintain a fairly constant level in the precipitating kettle as a rise in the level of the solution causes the air lift to remove a greater quantity and a fall in the level causes the air lift to remove a lesser quantity.

After the precipitate has settled in the settling and washing tanks, the mother liquor is drawn off with a syphon and either run into a sewer or, preferably, into a recovery tank as more fully explained hereinafter. The settling and washing tank is then filled with fresh water and by means of a lifting agitator I stir up the yellow precipitate to wash it. After the precipitate has settled again, the liquor is drawn off and wash water run in. The agitator is then started while slowly being lowered and is kept revolving until the yellow precipitate is thoroughly mixed with the wash water at which time the agitator is raised and stopped.

As previously stated, I preferably use fresh water as the first wash water and then wash the precipitate three or four times with a three-tenths per cent by volume solution of white nitric acid. This washing removes the chlorides from the precipitate but the yellow precipitate is not affected by nitric acid.

After thorough washing, sufficient water is added to the precipitate to form a thin paste which is conducted to a steam heated, rotating cylinder to which it is fed so that a thin layer of the paste precipitate is dried on the cylinder. The dried layer is brushed off or otherwise removed so as to produce a powder which is tungstic oxide, $WO_3$. The drying drum and associated mechanism is more fully disclosed in the application of B. B. Fogler, Serial Number 431,092, filed December 16, 1920. However, if desired, I may feed the thin paste to a filter and secure a sludge cake of tungstic oxide.

Into the recovery tank, which receives the mother liquor and wash waters from the settling and washing tank, is placed sufficient powdered lime to neutralize the acid and to precipitate calcium tungstate from the tungsten compounds contained in the mother liquor and wash waters. The contents of the recovery tank are titrated to determine the amount of lime required to neutralize the acid and precipitate calcium tungstate from the tungsten compounds contained therein and 50 per cent excess of lime is added to the calculated theoretical amount. After the precipitate has settled, the liquor is run into the sewer, and hot acid mother liquors resulting from the precipitation in the kettle 30 are drawn from the main process settling and washing tanks and added to the calcium tungstate. The reaction which takes place produces a crude tungstic acid which is then washed with water and treated with saturated sodium carbonate (soda ash) solution which reacts with the tungstic acid to form sodium tungstate which dissolves. The solution is then delivered to an Oliver filter and the filtered sodium tungstate solution which contains also some sodium carbonate and which has a concentration of approximately 2 pounds of $WO_3$ per gallon is delivered to the sodium tungstate solution storage tank previously described. The following three equations indicate the reactions taking place during the recovery process:

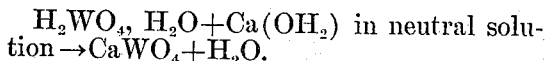
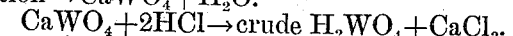
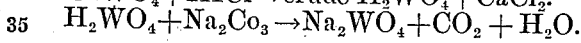

$H_2WO_4, H_2O + Ca(OH_2)$ in neutral solution $\rightarrow CaWO_4 + H_2O$.
$CaWO_4 + 2HCl \rightarrow$ crude $H_2WO_4 + CaCl_2$.
$H_2WO_4 + Na_2Co_3 \rightarrow Na_2WO_4 + CO_2 + H_2O$.

Sufficient hydrochloric acid is present in the mother liquor from the settling and washing tank to carry out the second reaction. The sludge cake from the filter consists mainly of iron oxide, silica and some calcium tungstate.

To summarize, in operation, wolframite ore is fed to the Raymond crusher and pulverizer and the pulverized ore is fed together with sodium carbonate and sodium nitrate into the Abbey ball mill mixer. From the mixer, the fusion mixture is conveyed to the control feed hopper 11 from which it is continuously fed at a predetermined rate to the rotating tube 22 of the furnace 15. Passing continuously down the furnace tube the mixture is fused to a mushy semi-liquid and drops out of the lower end of the tube into the leaching tank 29. Here the fusion products are leached and the products of the leaching operation continuously drawn off to be filtered. To the filtered solution, which contains the sodium tungstate, is added a solution of sodium nitrate and the resulting solution is preheated and continuously fed to the precipitating kettle 30 together with hydrochloric acid. Yellow tungstic oxide is precipitated in the kettle 30 and together with the mother liquor is continuously removed from the kettle 30 to the settling and washing tank. Here the precipitate is thoroughly washed and then fed to a rotary drier which dries it and delivers it as powdered yellow tungstic oxide.

The mother liquor and wash waters from the settling and washing tank of the main process are delivered to a recovery tank where they are treated with powdered lime to precipitate calcium tungstate. The precipitated calcium tungstate is treated with the mother liquor containing hydrochloric acid from another settling and washing tank of the main process to produce a crude tungstic oxide. The crude tungstic oxide is washed and then treated with sodium carbonate to form sodium tungstate which goes into solution and the solution is filtered, the filtered sodium tungstate solution being returned and added to the filtered sodium tungstate solution of the main process.

While I have described a specific embodiment of my invention, I do not wish to be limited thereto as modifications will readily suggest themselves to those skilled in the art. It is obvious, for example, that my invention may be used for the purification of a metallic oxide.

What I claim as new and desire to secure by Letters Patent of the United States is:

1. The process of preparing substantially pure tungsten oxide which consists in maintaining in a reservoir a solution of impure sodium tungstate, causing a continuous flow of said solution from said reservoir, treating the outflowing solution with a re-agent to precipitate therefrom the tungstic oxide, separating the tungstic oxide from the solution, treating the solution to eliminate the excess of the previously added re-agent, returning the solution to the reservoir and adding, from time to time, impure sodium tungstate to the solution in said reservoir to maintain it at a substantially constant specific gravity.

2. The process of preparing tungstic oxide which consists in maintaining in a reservoir a solution of impure sodium tungstate, causing a continuous outflow of said solution, subjecting the outflowing solution to the action of hydrochloric acid to cause a precipitation of tungstic oxide, separating the tungstic oxide from the solution, subjecting the remaining solution to the action of a re-agent to precipitate an insoluble tungstate, re-acting on the insoluble tungstate while in suspension with a re-agent forming from the same sodium tungstate, returning the sodium tungstate solution thus formed to the reservoir and adding, from time to time, impure sodium tungstate to the latter to maintain a substantially constant specific gravity.

3. The process of preparing tungstic oxide which consists in maintaining in a reservoir a solution of impure sodium tungstate, causing a continuous outflow of said solution, subjecting the outflowing solution to the action of a re-agent to precipitate tungstic oxide, agitating the tungstic acid to keep it in suspension and removing it to settling tanks, removing the tungstic oxide from the settling tanks, treating the solution to eliminate the excess of the previously added precipitant, returning the solution to the reservoir and adding from time to time impure sodium tungstate to the solution in said reservoir to maintain it at a substantially constant specific gravity.

In witness whereof, I have hereunto set my hand this thirteenth day of September 1920.

FRANK M. DORSEY.